United States Patent
Chue et al.

(10) Patent No.: US 7,050,249 B1
(45) Date of Patent: May 23, 2006

(54) SYSTEM AND METHOD FOR PROCESSING TRACK IDENTIFICATION DATA IN A DISK DRIVE

(75) Inventors: Jack M. Chue, Los Altos, CA (US); Jai N. Subrahmanyam, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 285 days.

(21) Appl. No.: 10/329,157

(22) Filed: Dec. 24, 2002

(51) Int. Cl.
   *G11B 5/09* (2006.01)

(52) U.S. Cl. ............................. 360/49; 360/31; 360/48; 360/75

(58) Field of Classification Search ................... 360/31, 360/48, 72.1, 72.3, 75, 53
   See application file for complete search history.

(56) References Cited

U.S. PATENT DOCUMENTS

| | | | | |
|---|---|---|---|---|
| 5,117,408 A | * | 5/1992 | Weispfenning et al. | 360/78.14 |
| 5,170,299 A | * | 12/1992 | Moon | 360/77.08 |
| 5,262,907 A | * | 11/1993 | Duffy et al. | 360/77.05 |
| 6,075,667 A | * | 6/2000 | Kisaka et al. | 360/49 |
| 6,233,106 B1 | * | 5/2001 | Chambers | 360/49 |
| 6,304,398 B1 | * | 10/2001 | Gaub et al. | 360/49 |
| 6,775,081 B1 | * | 8/2004 | Ottesen et al. | 360/48 |
| 6,831,808 B1 | * | 12/2004 | Ottesen et al. | 360/78.06 |
| 6,876,316 B1 | * | 4/2005 | Wu | 341/98 |

* cited by examiner

*Primary Examiner*—David Hudspeth
*Assistant Examiner*—Dismery Mercedes
(74) *Attorney, Agent, or Firm*—Jonathan E. Prejean, Esq.

(57) ABSTRACT

A system and method for processing track identification data in a disk drive having concentric tracks each having a track identification field (TIF) stored in embedded servo sectors, the TIF includes a band segment identifying a group of tracks, and an index segment identifying a single track of the group of tracks. The system and method include reading a servo sector to obtain the TIF, parsing the TIF to obtain the band segment, comparing the obtained band segment to an expected band segment to obtain a band segment differential (BSD), initiating an action if the BSD exceeds a pre-determined threshold and varies from the expected band segment by a predetermined number of bits, initiating another action if the BSD exceeds the predetermined threshold and does not vary from the expected band segment by the predetermined number of bits. The process is then applied to the index segments of the band segment.

38 Claims, 11 Drawing Sheets

SYSTEM AND METHOD FOR PROCESSING TRACK IDENTIFICATION DATA IN A DISK DRIVE

FIELD OF THE INVENTION

This invention relates to processing track identification data in a disk drive. More particularly, the present invention is directed to a system and method for processing track identification data obtained from a parsed track identification field.

BACKGROUND OF THE INVENTION

Since the inception of the data storage disks, the industry has pushed towards higher and higher data storage densities by increasing the number of tracks per inch on the data storage disks. The tracks are concentrically formed on the disk with each track having a corresponding identification field that identifies the individual track. Track identification fields are used for positioning of a recording head which is moved essentially in the radial direction of the disk as the disk is rotated. Each time the head is made to face a track by the combination of disk rotation and head movement, the track identification field of the track is read by the head and the position of the head is determined by a series of calculations performed on the read data. In this way the head can be positioned over a desired data track for performance of a read or write operation on the data track.

The increase in the number of tracks, however, has resulted in a corresponding increase in the length of the track identification field that in turn has introduced an added delay in the processing of the read data for determination of the position of the head. The added delay may result in the passage of head across three or more data tracks (while the head is moved across the disk) before the determination is made, thus resulting in identification read errors and misconception of head positioning.

Currently, magneto-resistive heads are the preferred heads used in the industry. Such magneto-resistive heads, however, are also susceptible to traditional noise phenomena well known in the art which may adversely interfere with the reading of the track identification fields by the head. These noise phenomena, such as baseline popping (BLP), are generally manifestations of kinks and loops that are present in the media field range of the magneto-resistive transfer curve and which give rise to observed head instabilities. The adverse effects of head instability become even more pronounced in face of the foregoing added delay in the longer processing time of the read data for determination of the position of the head. The various conventional techniques that can be used to deal with head instability cover a broad spectrum of solutions from screening at the head level to adjusting the channel response. These techniques, however, are relatively complicated and expensive to perform.

Accordingly, what is needed is a less expensive and reliable technique that addresses both the problems of the longer processing time of the read track identification field and the head instabilities during the read.

SUMMARY OF THE INVENTION

This invention can be regarded as a method for processing track identification data in a disk drive. The disk drive includes a plurality of concentric tracks, each track having a track identification field stored in a plurality of embedded servo sectors. Each track identification field includes a band segment identifying a group of tracks, and an index segment identifying a single track of the group of tracks. The method includes reading a servo sector to obtain the track identification field, parsing the track identification field to obtain the band segment, and comparing the obtained band segment to an expected band segment to obtain a band segment differential.

The method further includes initiating a first action if the band segment differential exceeds a first pre-determined threshold and varies from the expected band segment by a first pre-determined number of bits; and initiating a second action if the band segment differential exceeds the first predetermined threshold and does not vary from the expected band segment by the first pre-determined number of bits.

This invention can also be regarded as a system for processing track identification data in a disk drive. The disk drive includes a plurality of concentric tracks, each track having a track identification field stored in a plurality of embedded servo sectors. Each track identification field includes a band segment identifying a group of tracks, and an index segment identifying a single track of the group of tracks. The system includes an obtainment subsystem adapted to read a servo sector to obtain the track identification field, a parser subsystem adapted to parse the track identification field to obtain the band segment, and a comparison subsystem adapted to compare the obtained band segment to an expected band segment to obtain a band segment differential.

The system further includes an action initiator subsystem adapted to initiate a first action if the band segment differential exceeds a first pre-determined threshold and varies from the expected band segment by a first pre-determined number of bits; and to initiate a second action if the band segment differential exceeds the first predetermined threshold and does not vary from the expected band segment by the first pre-determined number of bits.

DETAILED DESCRIPTION OF THE INVENTION

Figure 1:
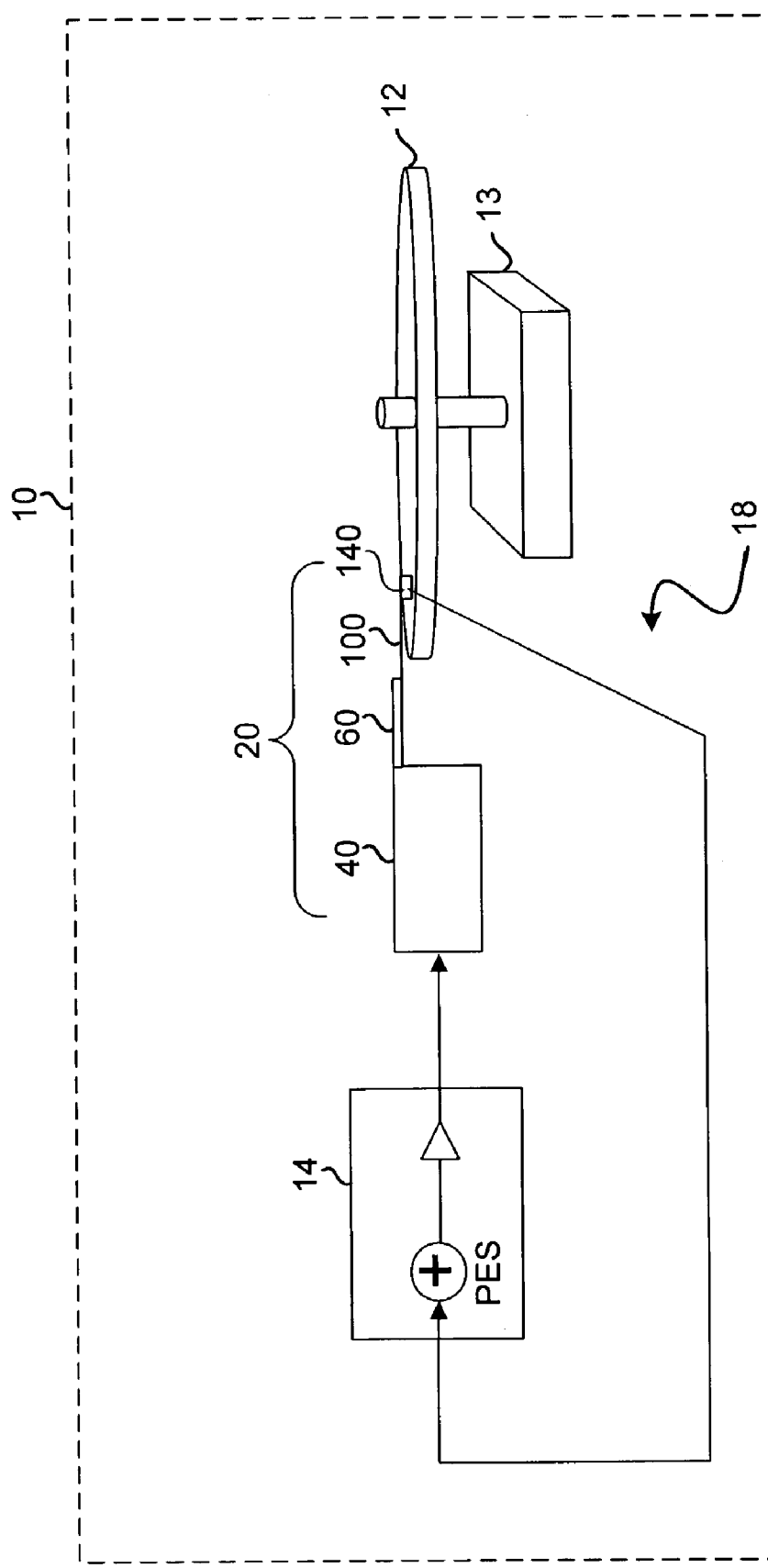
FIG. 1 illustrates a block diagram of a servo control loop in a disk drive.

With reference to FIG. 1, a schematic, block diagram of a servo control loop 18 is shown. Servo control loop 18 is used to position a transducer head 140 over a surface of a disk 12 in a disk drive 10 (not shown). A spindle motor 13 is included for rapidly rotating the disk 12. A head stack assembly 20 is located next to the disk 12 and includes an actuator body 40, and an actuator arm 60. A head gimbal assembly 100 extends from the actuator arm 60 and carries the head 140 over the disk 12. The servo electronics within the controller circuit board 14 control the actuator 20 based on servo signals fed back from the head 140 as it passes over the servo wedges. The operations of a servo control loop are well known in the art.

Figure 2A:
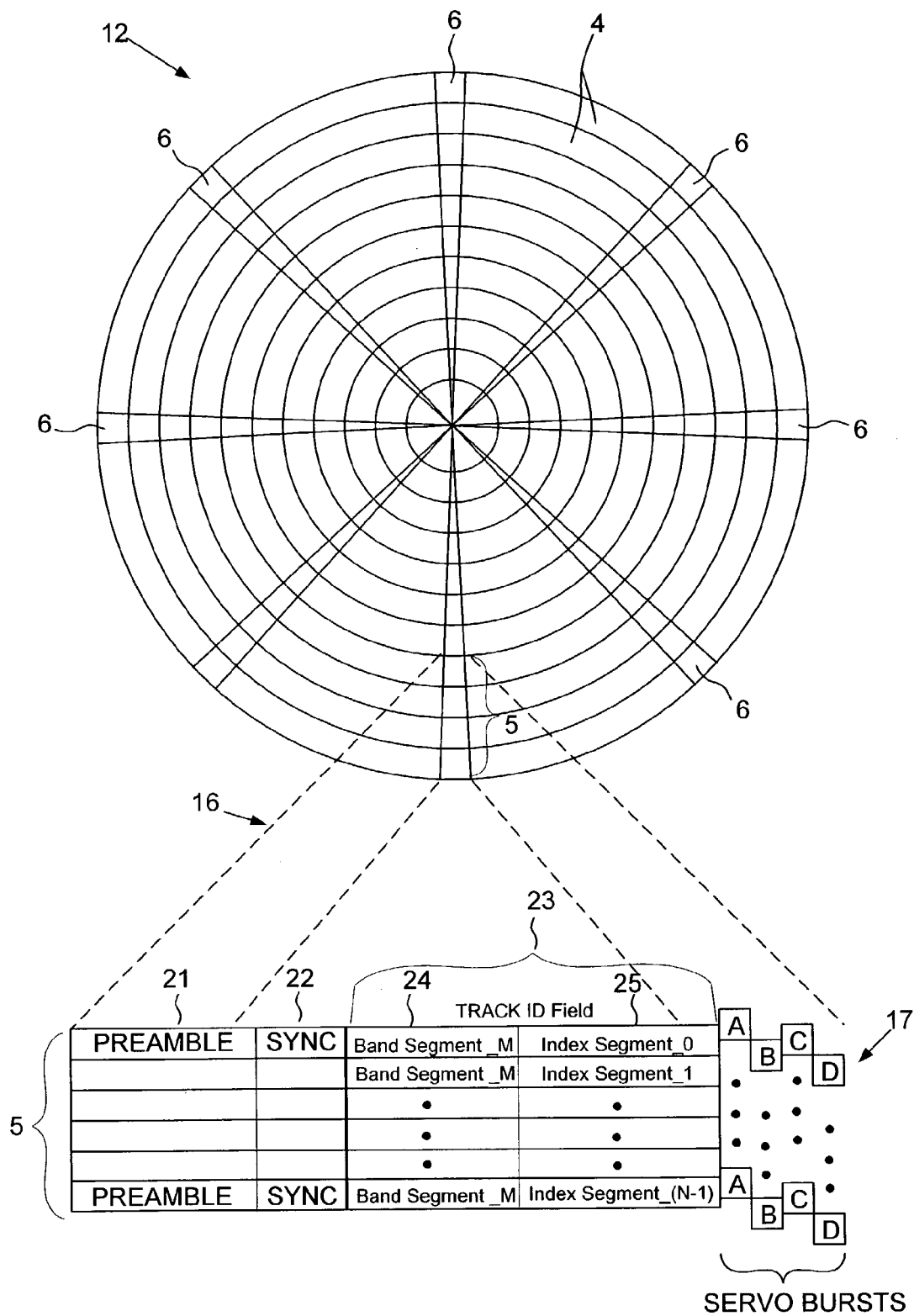
FIGS. 2A–B illustrate a disk formatted for use with a disk drive employing an embodiment of the present invention.

FIG. 2A illustrates a disk 12 formatted for use with disk drive 10. As shown, the disk 12 includes a plurality of radially-spaced, concentric tracks 4 which are partitioned into a plurality of data sectors. The disk 12 further includes a plurality of embedded servo sectors 16 (sometimes called servo "wedges") disposed in wedge-like areas 6 on the disk for use in positioning the head 140 over a desired track during write and read operations. A servo wedge 16 typically includes a preamble field 21 for synchronizing timing recovery and gain control within a read channel, and a sync mark 22 for symbol synchronizing to a track identification field 23. As is known in the art, track identification field 23 is generally encoded using a Gray Code algorithm, which minimizes ambiguity when a head is situated over two such adjacent fields by guaranteeing only a single bit difference between adjacent encoded fields. An embedded servo sector 16 also typically comprises a plurality of servo bursts 17 recorded at precise offsets from a track's centerline to provide fine head positioning information to the servo control system.

In a preferred embodiment of the present invention as shown in FIG. 2A, each track identification field 23 comprises a band segment 24 which identifies a group of tracks 5 by a designation such as Band Segment_M, where "M" is a variable by which each band segment is identified. Each track identification field 23 also comprises an index segment 25 identifying a single track 4 of the group of tracks 5, by designations such as Index Segment ranging from 0 to N-1, where "N" is the number of tracks in the group. As shown, a band segment 24 designation (Band Segment_M) remains the same for a group of tracks 5, while the index segments 25 designations change for each single track 4 within the group of tracks 5, such as designations Index Segment_0 through Index Segment_(N-1). In a preferred embodiment, a band segment 24 is Gray coded differently from an index segment 25.

Figure 2B:
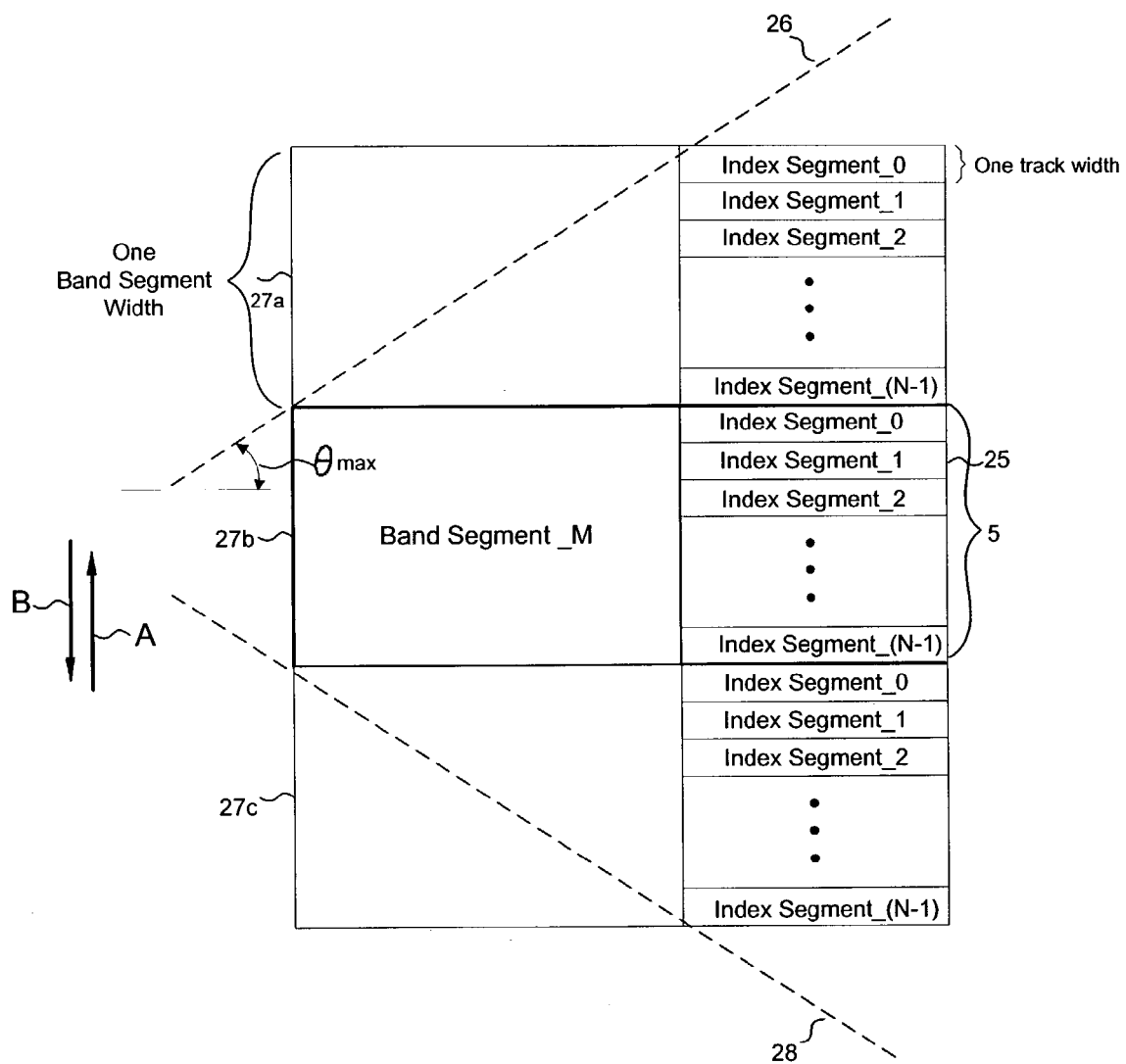

FIG. 2B further illustrates in greater detail the preferred embodiment of the present invention shown in FIG. 2A. For ease of illustration, the band segments 24 designated by Band Segment_M have been collectively shown as one block 27b. As described above, in the present invention, track identification field 23 includes a band segment 24 represented in the form of a first Gray code, and an index segment 25 represented in the form of a second Gray code. Locus 26 and 28 represent the boundary movement of the head 140 during a seek operation as the head 140 moves from the outer peripheral side of disk 12 to the inner peripheral side in the direction shown by arrow B, or from the inner peripheral side to the outer peripheral side in the direction shown by arrow A. A proximate positioning of the head 140 over the disk 12 can then be determined based on the first Gray code read by the head 140, while at which portion of a region consisting of a plurality of index segments 25 the head 140 is positioned can reliably be determined based on the second Gray code read by the head 140.

As shown in FIG. 2B, at the time when the head 140 has passed block 27b, the width of the range bounded by loci 26 and 28 (the range in which the first Gray code representing Band Segment_M and read by the head 140 is likely to become that of block 27b) is about three blocks of 27a, 27b and 27c. Consequently, if the first Gray code read by the head 140 is that of Band Segment_M of block 27b it can be determined that the head 140 has passed the range of three block widths having the block 27b as the first Gray code as the center and bounded by the loci 26 and 28. Since the second Gray code represents a value, which circulates for each plurality of band segments 25, its number of necessary bits is small compared to the conventional identification information representing the track address itself, and the recording length of the second Gray code may thus be short compared to the conventional identification information. Accordingly, in this configuration, the allowable maximum value of angle theta formed by the locus 26 drawn by the head 140 passing an index segment 25 becomes larger.

Returning to FIG. 2A, thus even if the passage of head 140 spans the identification information fields 23 of, for instance, three or more tracks 4, the positioning of the head 140 can be determined based on the combination of the first and the second Gray codes representing a band segment 24 and an index segment 25. Further details and advantages associated with the use of the above configuration of tracks on a disk drive are described in the U.S. Pat. No. 6,075,667 entitled "Method and apparatus for determining head positioning in a magnetic disk drive system using first and second gray codes", herein incorporated by reference.

The present invention also mitigates the effects of head instability in data storage devices by adding robustness to the processing of the band segment 24 and index segment 25 performed in disk drive firmware. Characterization of servo failures indicates that most servo failures are due to single bit errors in the track id field of the servo wedge. Because it is known that one bit errors occur most frequently, it is possible to modify the servo firmware to detect single bit, or more generally, N-bit track id errors that occur during the tracking mode to help cope with head instability. In order to do this, the drive firmware must distinguish between off-track errors and N-bit errors caused by head instability during track following. In one embodiment, the servo firmware can characterize single bit or multiple bit errors (i.e. N-bit mismatches) that result in a read-back track identification field that differs from the expected track identification field by more than a pre-determined threshold number of tracks (e.g. five tracks) and has a Hamming distance of one bit or a Hamming distance of a pre-configured number of bits (N) in the Gray code domain. The details of the Hamming distance and its computations are described in the patent application entitled "SYSTEM AND METHOD FOR PROCESSING TRACK IDENTIFIER ERRORS TO MITIGATE HEAD INSTABILITY IN DATA STORAGE DEVICES", filed on Jun. 1, 2002 as U.S. Ser. No. 10/160,954, the details of which are herein incorporated by reference.

Figure 3A:
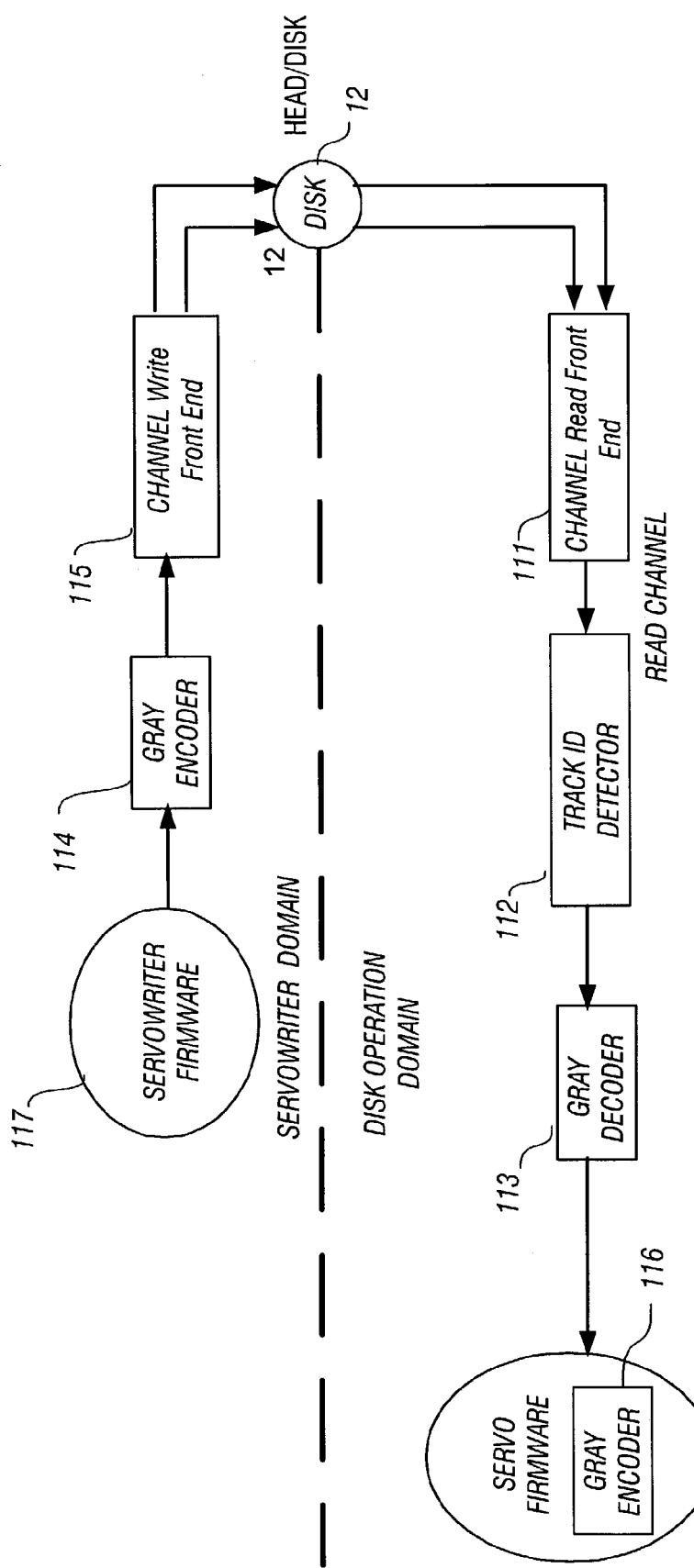
FIGS. 3A–B illustrate the servo track identification field detection system of the various embodiments of the present invention.

In order to illustrate the invented technique in a system embodiment, a block diagram of an exemplary servo track identification field detection system suitable for use with the present invention is shown in FIG. 3A. The servo track identification field detection system can be implemented as part of the disk drive controller circuit board 14 shown in FIG. 1. In one embodiment, the servo track identification field detection system is implemented partly in hardware and partly in software (i.e. firmware). Other embodiments employing the presently disclosed and claimed invention can similarly be implemented in purely hardware or software systems. Although changes can be made to the hardware architecture, it is also possible to cope with head instability errors with an effective error detection mechanism as provided by the present invention.

Figure 3B:
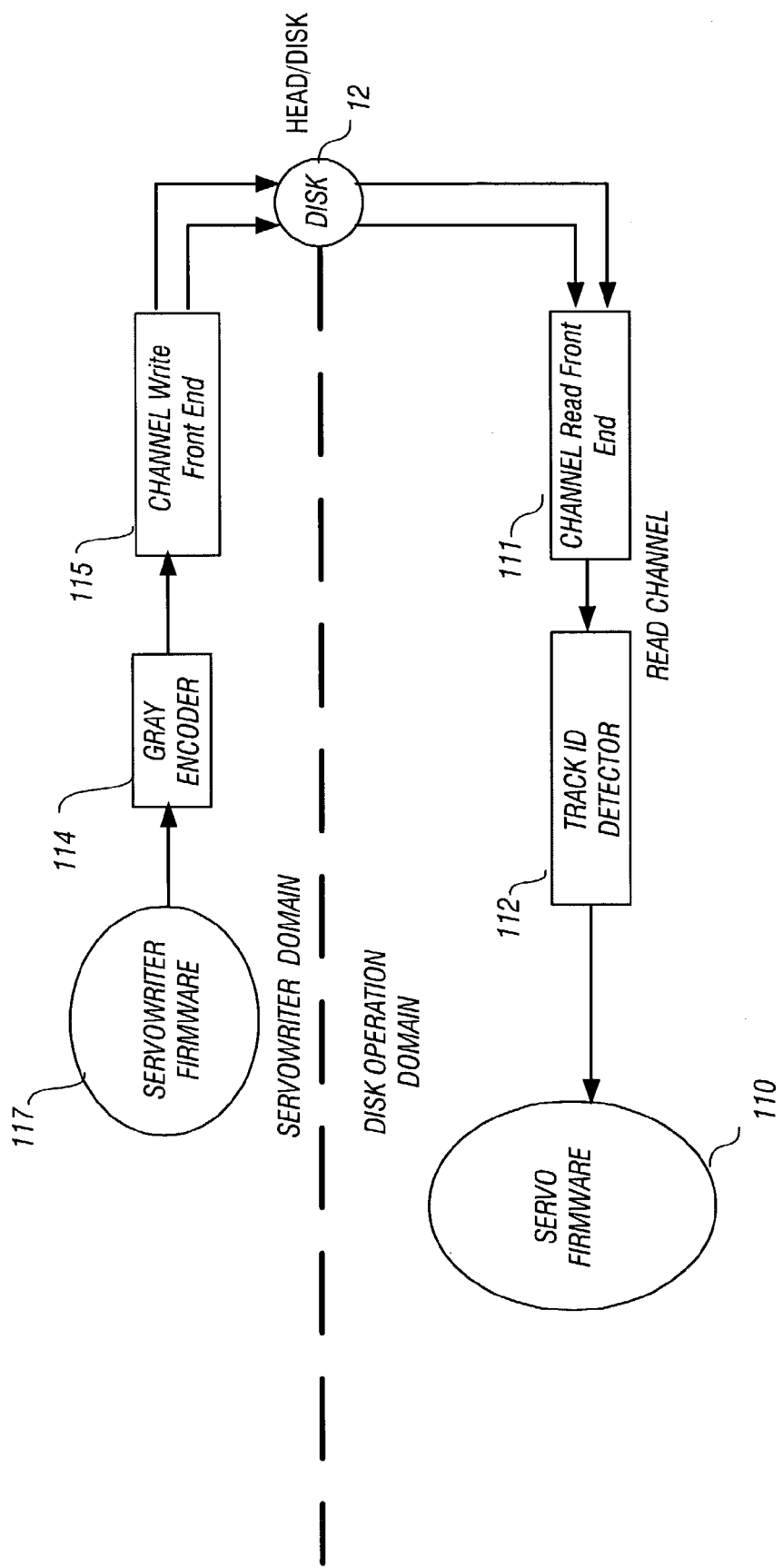

Referring to FIG. 3A, the general flow of track identification field data between disk 12 and servo firmware 110 is illustrated. In general, a channel read front end component 111 receives data from the disk 12 on a read channel. The track identification field detector 112, including a sampler and a threshold detector, obtains the track identification field 23 from the read data. The Gray decoder 113 converts the received track identification field 23 from the well-known Gray encoded format to a binary value. The decoded received identification field is delivered to the servo firmware 110 at where the Gray Encoder 116 encodes the received track identification from the binary value to the well-known Gray encoded format. The encoded track identification is then processed in the manner more fully described below. In an alternate preferred embodiment as shown in FIG. 3B, the output from the track identification field detector 112 is inputted directly into the servo firmware 110 and processed in the manner more fully described below. During disk formatting operations as may be performed by a conventional servo-writer having servo-writer firmware 117, the track identification field 23 is typically encoded by Gray encoder 114, and written to disk 12 by channel write front end process 115.

Figure 4A:
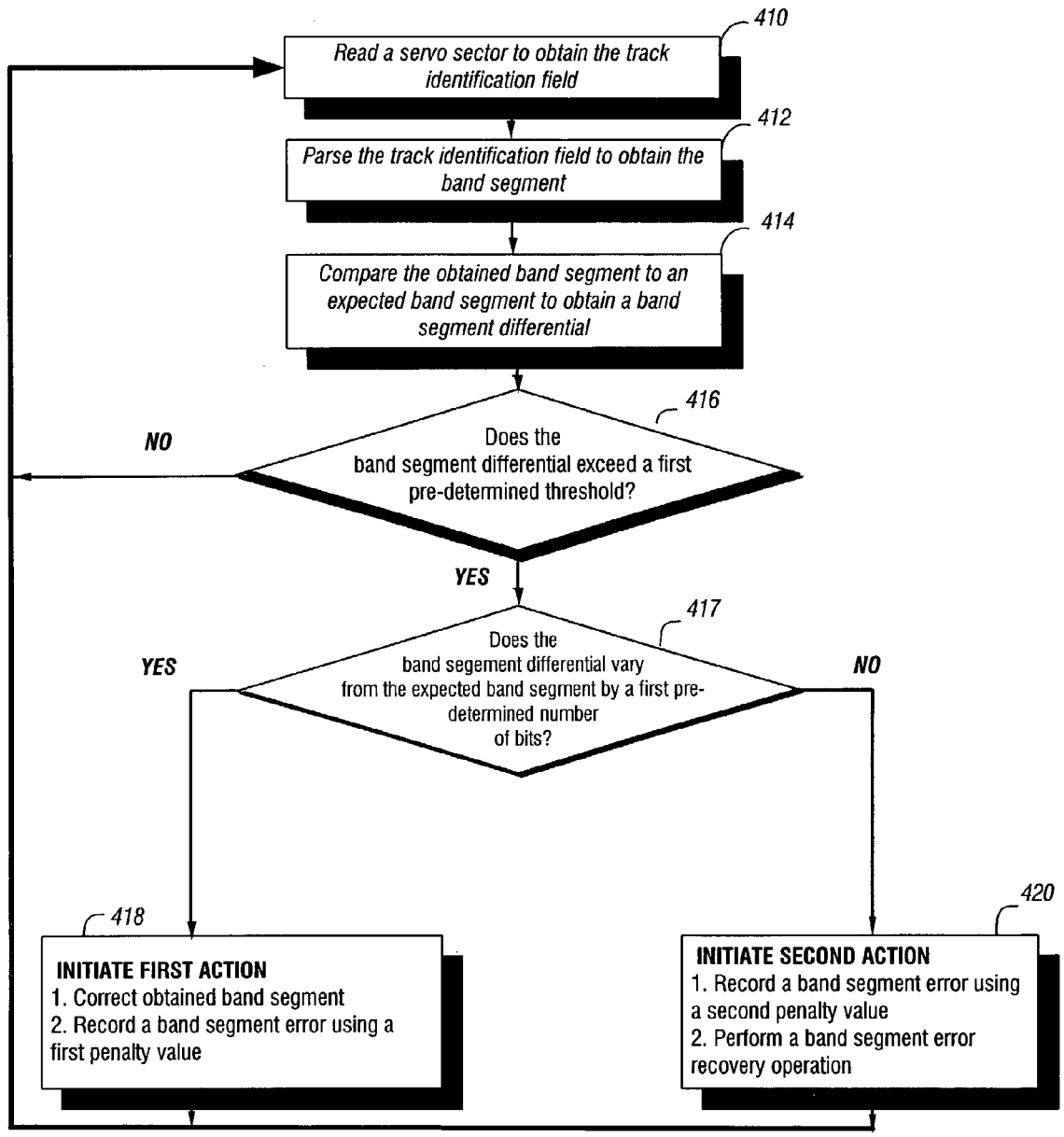
FIGS. 4A–B illustrate a process used in an embodiment of the present invention.

Referring now to FIG. 4A, a method is disclosed for processing the track identification data in a disk drive 12 wherein the disk drive 12 (as described in conjunction with FIG. 2A) includes a plurality of concentric tracks 4, each track 4 having a track identification field 23 stored in a plurality of embedded servo sectors 6, each track identification field 23 including a band segment 24 identifying a group of tracks 5, and an index segment 25 identifying a single track 4 of the group of tracks 5. Beginning with block 410, the method includes reading a servo sector 6 to obtain the track identification field 23. Next in block 412, the track identification field 23 is parsed to obtain the band segment 24. In block 414, the obtained band segment 24 is compared to an expected band segment to obtain a band segment differential. In a preferred embodiment, the obtained band segment 24 is encoded with a Gray Code.

Next, in decision block 416 it is determined if the band segment differential exceeds a first pre-determined threshold. If the band segment differential does not exceed a first pre-determined threshold then the flow is returned to block 410. If the band segment differential exceeds the first predetermined threshold, then the flow proceeds to the decision block 417. In decision block 417, if it is determined that the band segment differential varies from the expected band segment by a first pre-determined number of bit, such as one bit, then the flow proceeds to block 418 in which a first action is initiated. In a preferred embodiment, the determination in block 417 is based on computing a first Hamming distance between the expected band segment and the obtained band segment 24. In a preferred embodiment, the first action includes correcting the obtained band segment 24. In a preferred embodiment the first action further includes recording a band segment error using a first penalty value.

Returning to the decision block 417, if it is determined that the band segment differential does not vary from the expected band segment by a first pre-determined number of bit, such as one bit, then the flow proceeds to block 420 in which a second action is initiated. In a preferred embodiment, the second action includes recording a band segment error using a second penalty value. In a preferred embodiment, the second action further includes performing a band segment error recovery operation.

In a preferred embodiment, the servo firmware 110 increments an error counter when it encounters an invalid value for a band segment 24. In one embodiment of the firmware, the counter is incremented by, for example, 10 or some equivalent penalty value for each band segment error encountered. Furthermore, a valid band segment 24 acts to balance against errors by decrementing 1 or some equivalent compensating value from a non-zero error count. An error counter limit is typically set at a value related to how much uncertainty the track following servo system can accommodate. In one embodiment, this limit, for example, is set between 50 and 100.

Figure 4B:
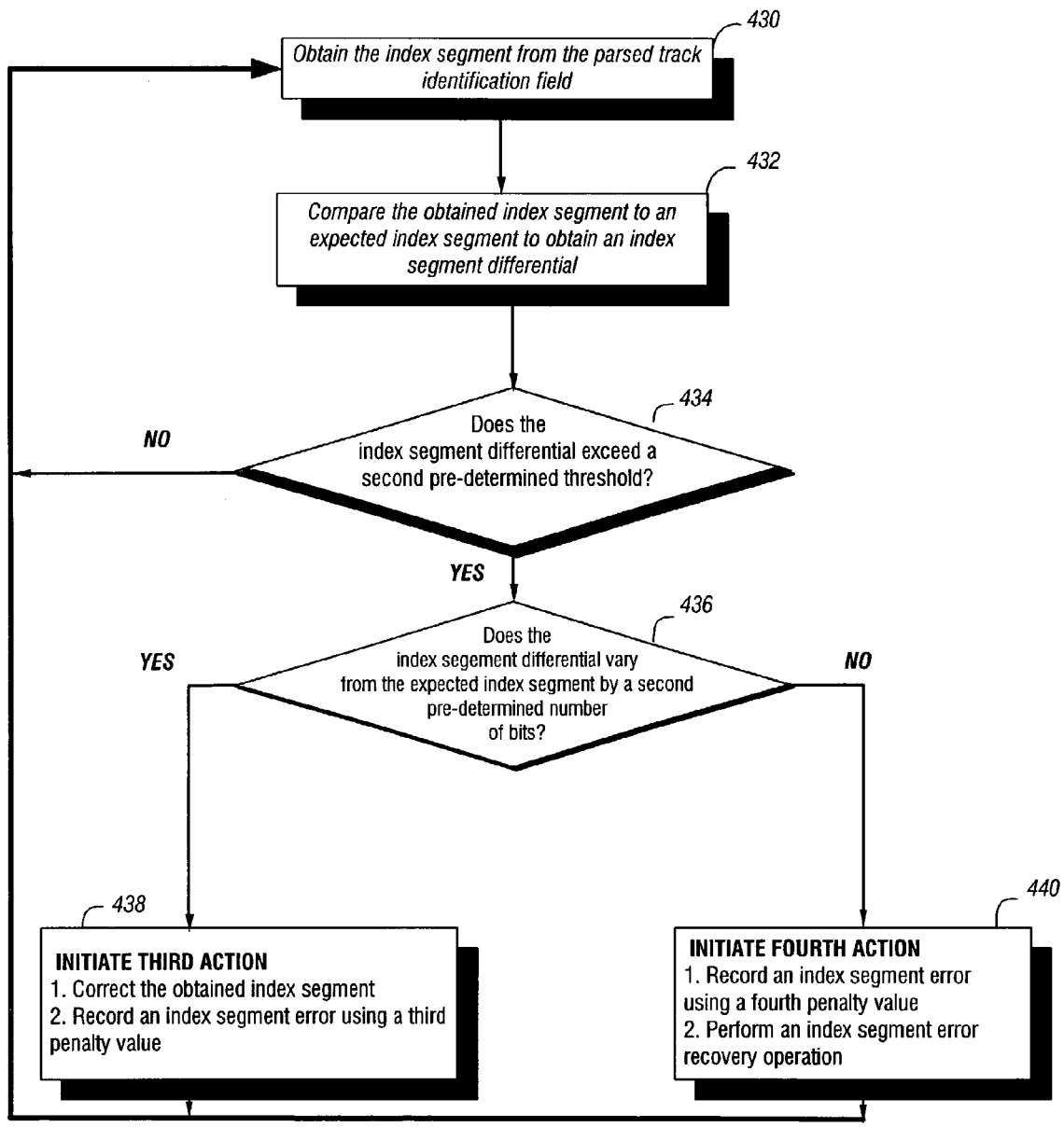

Referring now to FIG. 4B, a method is disclosed for processing the index segment 25 corresponding to the band segment 24 obtained by the process described in FIG. 4A. Beginning with block 430, the method includes obtaining the index segment 25 from the parsed track identification field 23. Next in block 432, the obtained index segment 25 is compared to an expected index segment to obtain an index segment differential. In a preferred embodiment, the obtained index segment 25 is encoded with a Gray Code.

Next, in decision block 434 it is determined if the index segment differential exceeds a second pre-determined threshold. If the index segment differential does not exceed the second predetermined threshold then the flow is returned to block 430. If the index segment differential exceeds the second predetermined threshold, then the flow proceeds to the decision block 436. In decision block 436, if it is determined that the index segment differential varies from the expected index segment by a second pre-determined number of bit, such as one bit, then the flow proceeds to block 438 in which a third action is initiated. In a preferred embodiment, the determination in block 417 is based on computing a first Hamming distance between the expected index segment and the obtained index segment 25. In a preferred embodiment, the third action includes correcting the obtained index segment 25. In a preferred embodiment the third action further includes recording an index segment error using a third penalty value.

Returning to the decision block 436, if it is determined that the index segment differential does not vary from the expected index segment by the second pre-determined number of bit, such as one bit, then the flow proceeds to block 440 in which a fourth action is initiated. In a preferred embodiment, the fourth action includes recording an index segment error using a fourth penalty value. In a preferred embodiment, the fourth action further includes performing an index segment error recovery operation.

In a preferred embodiment, the servo firmware 110 increments an error counter when it encounters an invalid value for an index segment 25. In one embodiment of the firmware, the counter is incremented by, for example, 10 or some equivalent penalty value for each index segment error encountered. Furthermore, a valid index segment 25 acts to balance against errors by decrementing 1 or some equivalent compensating value from a non-zero error count. An error counter limit is typically set at a value related to how much uncertainty the track following servo system can accommodate. In one embodiment, this limit, for example, is set between 50 and 100.

Figure 5A:
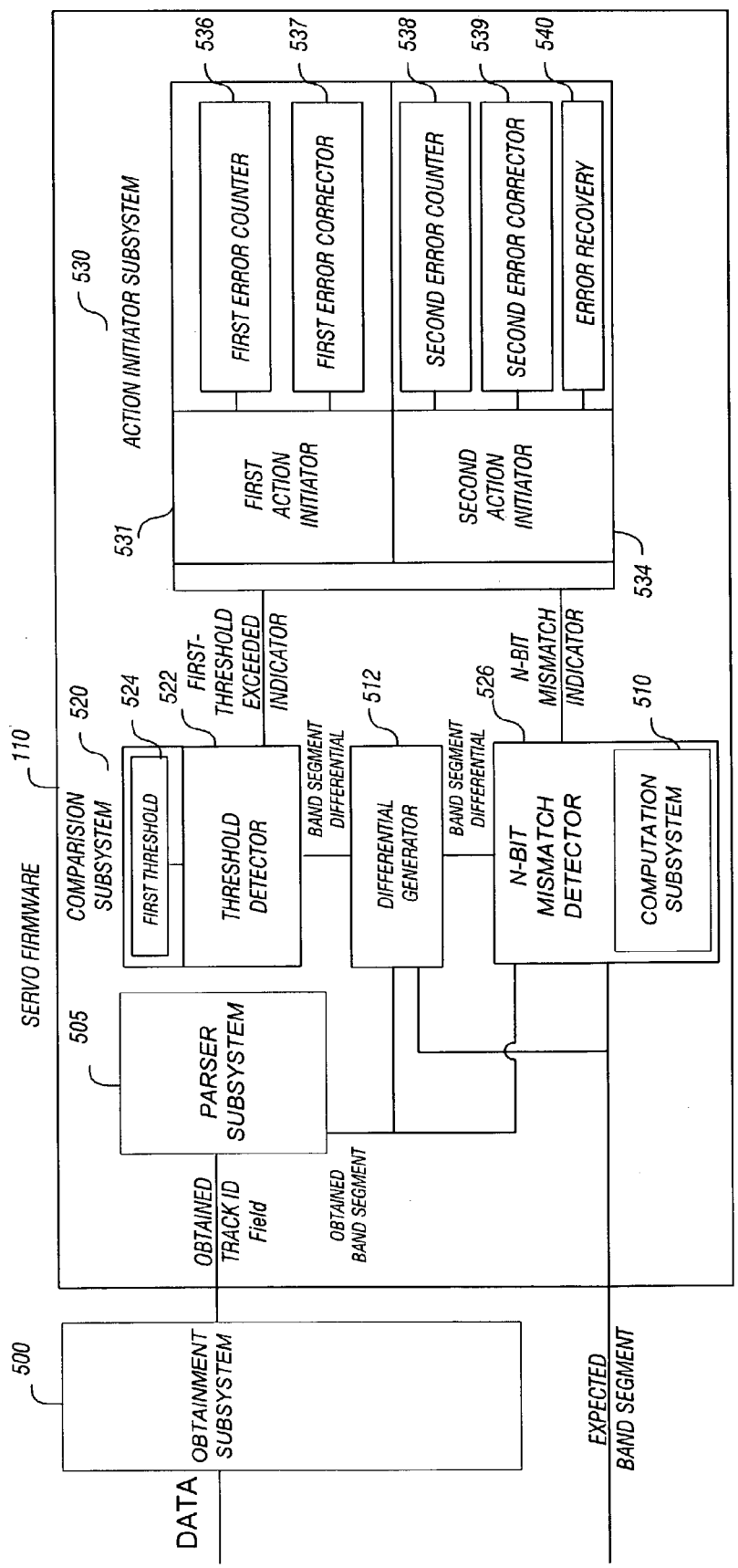
FIGS. 5A–B illustrate subsystems of embodiments of the present invention.

Referring now to FIG. 5A, a system embodiment of the present invention is illustrated for processing the track identification data in the disk drive 10 wherein the disk 12 (as described in conjunction with FIG. 2A) includes a plurality of concentric tracks 4, each track 4 having a track identification field 23 stored in a plurality of embedded servo sectors 6, each track identification field 23 including a band segment 24 identifying a group of tracks 5, and an index segment 25 identifying a single track 4 of the group of tracks 5. As shown in FIG. 5A, the system of the present invention includes an obtainment subsystem 500 and a portion of servo firmware 110. The servo firmware 110 includes three subsystems used by an embodiment of the present invention. These three subsystems are the parser subsystem 505, the comparison subsystem 520, and the action initiator subsystem 530. In the manner consistent with the process described in conjunction with FIG. 4A, the servo firmware 110 receives a track identification field 23 as read from disk 12 by the obtainment subsystem 500 adapted to read a servo sector 6 from disk 12 to obtain the track identification field 23. The received track identification field 23 is then forwarded to the parser subsystem 505 adapted to parse the track identification field 23 to obtain the band segment 25.

Next, the obtained band segment 24 is received in the comparison subsystem 520 adapted to compare the obtained band segment 24 to an expected band segment to obtain a band segment differential. The differential generator 512 portion of comparison subsystem 520 is adapted to compute the absolute value of the difference between the expected band segment value and the received band segment 24 value. The resulting band segment differential is provided as input to both the threshold detector 522 and the N-bit mismatch detector 526. In a preferred embodiment the obtained band segment 24 is encoded with a Gray code.

The threshold detector 522 of comparison subsystem 520 receives the band segment differential generated by the differential generator 512. The band segment differential is then compared with a first pre-determined threshold value 524 pre-configured in comparison subsystem 520 or another portion of servo firmware 110. If threshold detector 522 determines that the input band segment differential is greater than the first predetermined threshold 524, a first threshold exceeded indicator is output to action initiator subsystem 530. Otherwise, the first threshold exceeded indicator output to action initiator subsystem 530 is cleared.

The resulting band segment differential is also provided as input to the N-bit mismatch detector 526, which additionally receives an expected band segment. The N-bit mismatch detector 526 includes a computation subsystem 510 adapted to compute a first Hamming distance between the expected band segment and the obtained band segment 25, using conventional techniques. If the computed Hamming distance indicates a mismatch of a pre-configured N number of bits, such as one bit, between the expected band segment and the obtained band segment 24, an N-bit mismatch indicator is set and output to action initiator subsystem 530. Otherwise, the N-bit mismatch indicator output to action initiator subsystem 530 is cleared.

Action initiator subsystem 530 receives the first threshold exceeded indicator from threshold detector 522 and the N-bit mismatch indicator from N-bit mismatch detector 526. As a result of the values held by these indicators, action initiator subsystem 530 initiates one or more actions to handle the potential error indicated by previous processing performed on the expected band segment and the obtained band segment 24. It will be apparent to one of ordinary skill in the art that action initiator subsystem 530 may include a plurality of actions to be initiated upon the detection of various error events.

In one embodiment, action initiator subsystem 530 triggers a first action initiator 531 if the first threshold exceeded indicator is set to true and the N-bit mismatch indicator is set to true, signifying that the band segment differential exceeds the first pre-determined threshold and varies from the expected band segment by the first pre-determined number of bits, such as by one bit. In this case, the presence of a head instability induced band segment error has been detected. In response to the head instability error, first action initiator 531 records a band segment error in a first error counter 536 using a first penalty value, and may further initiate a first error corrector 537 process to correct the head instability error. For example, first error corrector 537 may include correcting the obtained band segment 24 by setting the received band segment 24 to the value of the expected band segment. It will be apparent to one of ordinary skill in the art that other actions resulting from the detection of head instability errors may similarly be initiated by first action initiator 531.

In another embodiment, action initiator subsystem 530 triggers the second action initiator 534 if the threshold exceeded indicator is set to true and the N-bit mismatch indicator is cleared or false, signifying that the band segment differential exceeds the first predetermined threshold and does not vary from the expected band segment by the first pre-determined number of bits, such as by one bit. In this case, the presence of an error cannot necessarily be linked to the presence of head instability. In this case, second action initiator 534 records the band segment error in a second error counter 538 using a second penalty value, and may either attempt band segment error correction using a second error corrector 539 or a separate band segment error recovery operation 540 to handle the detected error. Again, it will be apparent to one of ordinary skill in the art that second action initiator 534 may trigger a variety of actions resulting from the detection of errors indicated by the first threshold exceeded indicator and the N-bit mismatch indicator. Thus, as shown in FIG. 5A, the additional functionality provided by the present invention may be used to detect various types of errors occurring in the reading of track identification field 23 information from the disk 12.

Figure 5B:
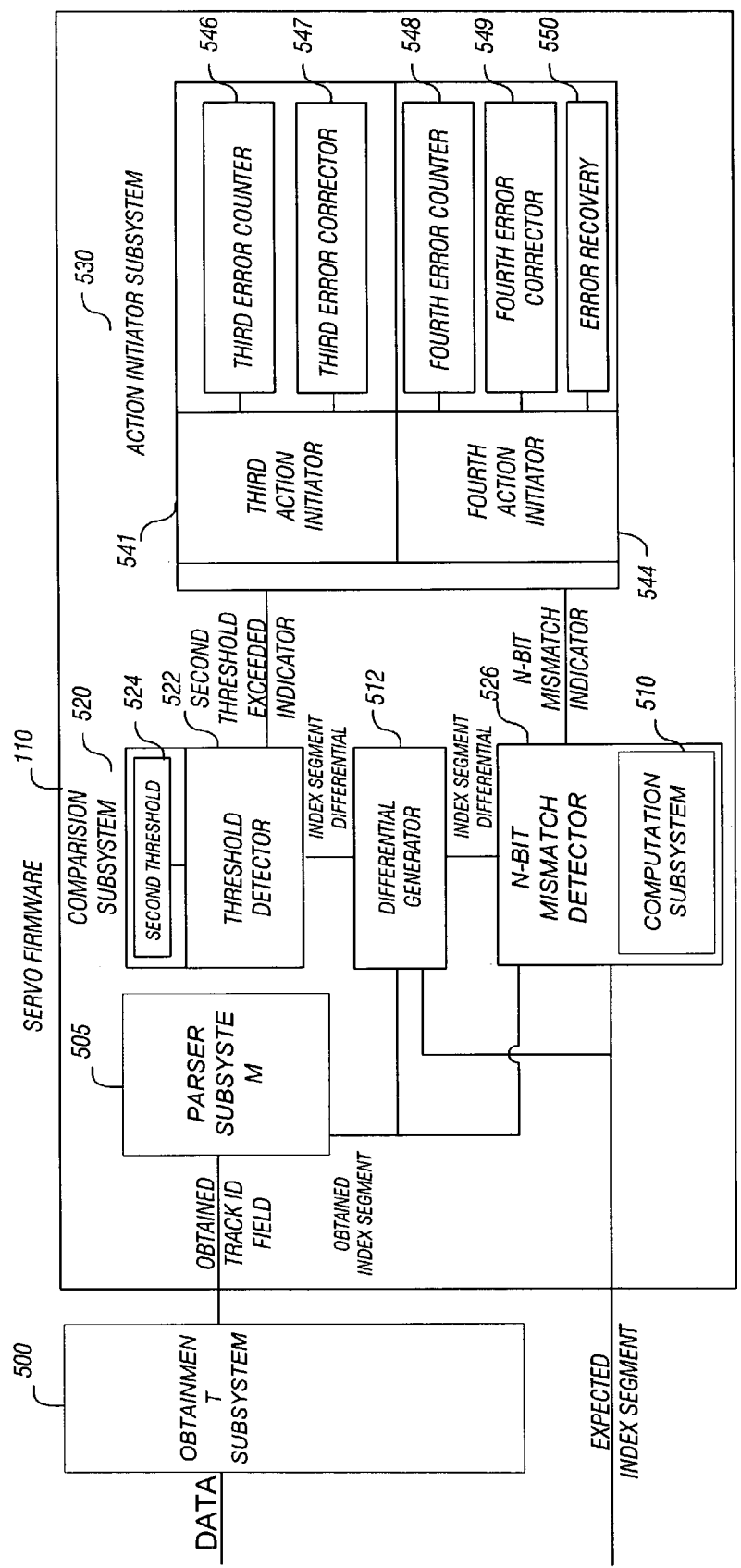

Referring now to FIG. 5B, another preferred system embodiment of the present invention is described for processing the index segment 25 corresponding to the band segment 24 obtained by the system described in FIG. 5A. In the manner consistent with the process described in conjunction with FIG. 4B, the parser subsystem 505 is further adapted to obtain the index segment 25 from the parsed track identification field 23.

Next, the obtained index segment 25 is received in the comparison subsystem 520 further adapted to compare the obtained index segment 25 to an expected index segment to obtain a index segment differential. The differential generator 512 portion of comparison subsystem 520 is adapted to compute the absolute value of the difference between the expected index segment value and the received index segment 25 value. The resulting index segment differential is provided as input to both the threshold detector 533 and the N-bit mismatch detector 526. In a preferred embodiment the obtained index segment 25 is encoded with a Gray Code.

The threshold detector 522 of comparison subsystem 520 receives the index segment differential generated by the differential generator 512. The index segment differential is then compared with a second pre-determined threshold value 524 pre-configured in comparison subsystem 520 or another portion of servo firmware 110. If threshold detector 522 determines that the input index segment differential is greater than the second pre-determined threshold 524, a second threshold exceeded indicator is output to action initiator subsystem 530. Otherwise, the second threshold exceeded indicator output to action initiator subsystem 530 is cleared.

The resulting index segment differential is also provided as input to the N-bit mismatch detector 526, which additionally receives an expected index segment. The N-bit mismatch detector 526 includes the computation subsystem 510 further adapted to compute a second Hamming distance between the expected index segment and the obtained index segment 25, using conventional techniques. If the computed Hamming distance indicates a mismatch of a pre-configured N number of bits, such as one bit, between the expected index segment and the obtained index segment 25, an N-bit mismatch indicator is set and output to action initiator subsystem 530. Otherwise, the N-bit mismatch indicator output to action initiator subsystem 530 is cleared.

Action initiator subsystem 530 receives the first threshold exceeded indicator from threshold detector 522 and the N-bit mismatch indicator from N-bit mismatch detector 526. As a result of the values held by these indicators, action initiator subsystem 530 initiates one or more actions to handle the potential error indicated by previous processing performed on the expected index segment and the obtained index segment 25. It will be apparent to one of ordinary skill in the art that action initiator subsystem 530 may include a plurality of actions to be initiated upon the detection of various error events.

In one embodiment, action initiator subsystem 530 triggers a third action initiator 541 if the second threshold exceeded indicator is set to true and the N-bit mismatch indicator is set to true, signifying that the index segment differential exceeds the second pre-determined threshold and varies from the expected index segment by the second pre-determined number of bits, such as by one bit. In this case, the presence of a head instability induced index segment error has been detected. In response to the head instability error, third action initiator 541 records an index segment error in a third error counter 546 using a third penalty value, and may further initiate a third error corrector 547 process to correct the head instability error. For example, third error corrector 547 may include correcting the obtained index segment 25 by setting the received index segment 25 to the value of the expected index segment. It will be apparent to one of ordinary skill in the art that other actions resulting from the detection of head instability errors may similarly be initiated by third action initiator 541.

In another embodiment, action initiator subsystem 530 triggers the fourth action initiator 544 if the second threshold exceeded indicator is set to true and the N-bit mismatch indicator is cleared or false, signifying that the index segment differential exceeds the second predetermined threshold and does not vary from the expected index segment by the second pre-determined number of bits, such as by one bit. In this case, the presence of an error cannot necessarily be linked to the presence of head instability. In this case, fourth action initiator 544 records the index segment error in a fourth error counter 548 using a fourth penalty value, and may either attempt index segment error correction using a fourth error corrector 549 or a separate index segment error recovery operation 550 to handle the detected error. Again, it will be apparent to one of ordinary skill in the art that fourth action initiator 544 may trigger a variety of actions resulting from the detection of errors indicated by the second threshold exceeded indicator and the N-bit mismatch indicator. Thus, as shown in FIG. 5B, the additional functionality provided by the present invention may be used to detect various types of errors occurring in the reading of track identification field 23 information from the disk 12.

Figure 6:
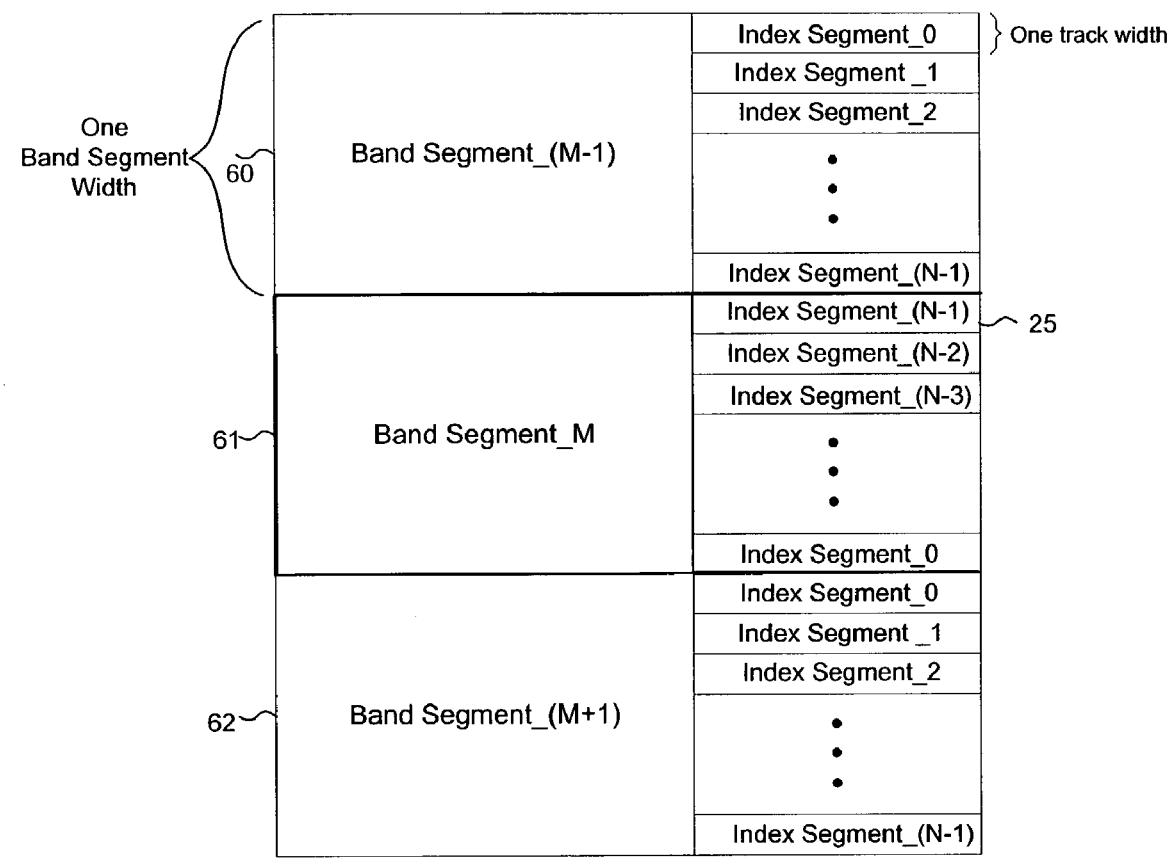
FIG. 6 illustrates a disk formatted for use with a disk drive employing another embodiment of the present invention.

FIG. 6 illustrates a disk 12 formatted for use with a disk drive 10 employing another embodiment of the present invention. As shown, the band segments 24 are grouped in a plurality of band segment groups, such as band segment groups 60, 61 and 62, of a predetermined number of tracks 4. The band segments 24 in each band segment group differ from the band segments 24 in an adjacent band segment group by a predetermined increment such as 1. In another preferred embodiment, the index segments 25 in each band segment group are arranged in an ascending or descending order, such as from Index Segment_0 to Index Segment_(N−1), where N is a predetermined number such as 15, signifying a predetermined range of tracks identified by the index segments, such as from Index Segment_0 to Index Segment_14. In a preferred embodiment, each band segment group has a different arranged index segment order from its adjacent band segment group. For example, the band segment group 61 has a descending index segment order ranging from Index Segment_(N−1) to Index Segment_0, which is different from its adjacent band segment groups 60 and 62 each having an ascending index segment order ranging from Index Segment_0 to Index Segment_(N−1). Advantageously, these differently arranged index segments provide for Gray coding the combined band and index segments such that a single bit Gray code difference exists between tracks at band segment boundaries. This is consistent with desired practice in resolving track identification ambiguity when adjacent fields are read during the same servo period.

Figure 7:
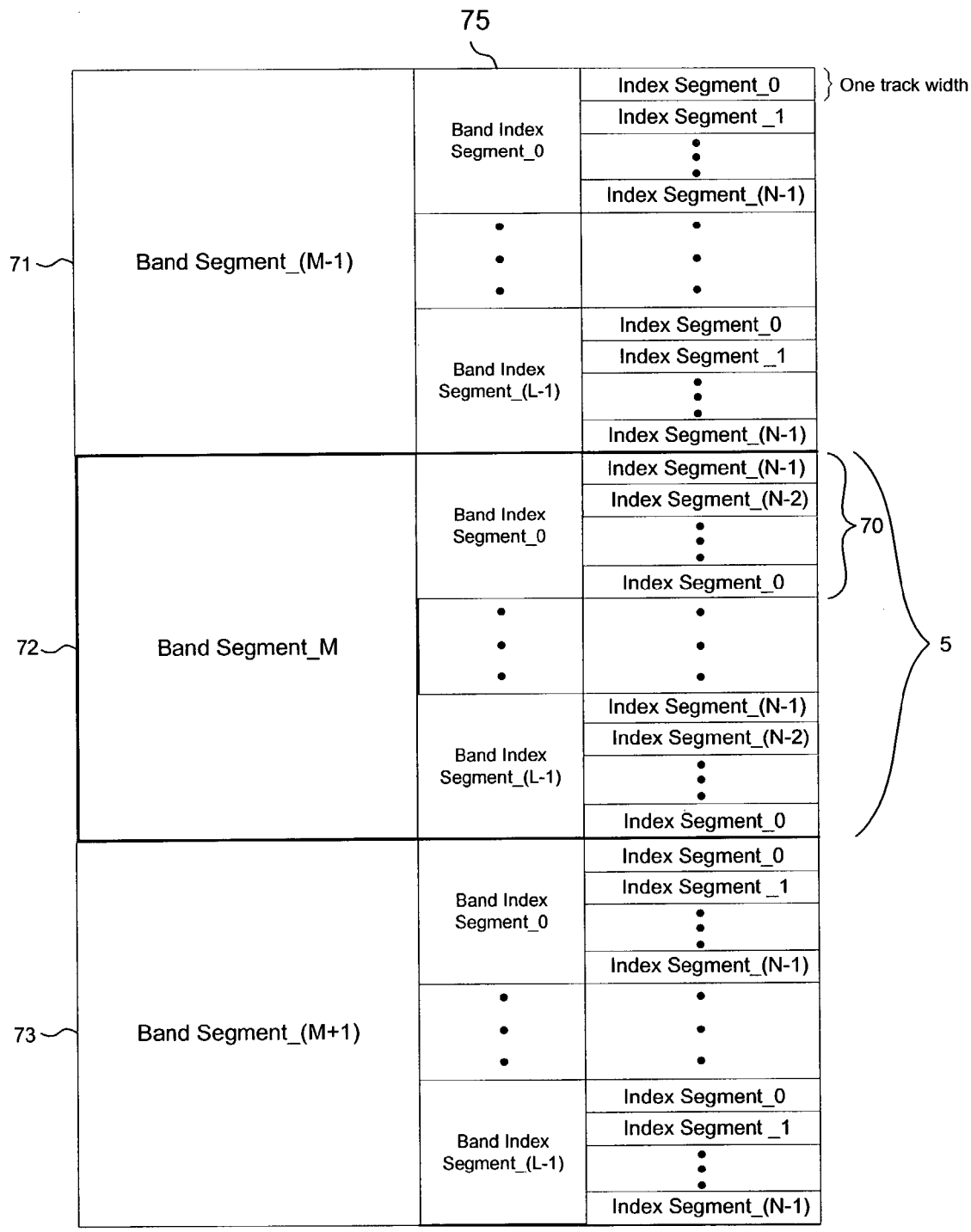
FIG. 7 illustrates a disk formatted for use with a disk drive employing yet another embodiment of the present invention.

FIG. 7 illustrates a disk 12 formatted for use with a disk drive 10 employing yet another embodiment of the present invention. In this embodiment, the track identification field 23 further includes a band index segment 75 wherein the band index segment 75 further identifies a sub-group 70 of the group of tracks 5 and each band segment 24 further identifies a group of band index segments 75.

It should be noted that the various features of the foregoing preferred embodiments were discussed separately for clarity of description only and they can be incorporated in whole or in part into a single preferred embodiment of the invention having all or some of these features.

What is claimed is:

1. A method for processing track identification data in a disk drive comprising a plurality of concentric tracks, each track comprising a track identification field stored in a plurality of embedded servo sectors, each track identification field comprising a band segment identifying a group of tracks, and an index segment identifying a single track of the group of tracks, the method comprising:

reading a servo sector to obtain the track identification field;

parsing the track identification field to obtain the band segment;

comparing the obtained band segment to an expected band segment to obtain a band segment differential;

initiating a first action if the band segment differential exceeds a first pre-determined threshold and varies from the expected band segment by a first pre-determined number of bits; and initiating a second action if the band segment differential exceeds the first predetermined threshold and does not vary from the expected band segment by the first pre-determined number of bits;

obtaining the index segment from the parsed track identification field;

comparing the obtained index segment to an expected index segment to obtain an index segment differential; and initiating a third action if the index segment differential exceeds a second pre-determined threshold and varies from the expected index segment by a second pre-determined number of bits; and initiating a fourth action if the index segment differential exceeds the second predetermined threshold and does not vary from the expected index segment by the second pre-determined number of bits.

2. The method as claimed in claim 1 wherein the first action includes correcting the obtained band segment.

3. The method as claimed in claim 2 wherein the first action further includes recording a band segment error using a first penalty value.

4. The method as claimed in claim 1 wherein the third action includes correcting the obtained index segment.

5. The method as claimed in claim 4 wherein the third action further includes recording an index segment error using a third penalty value.

6. The method as claimed in claim 1 wherein the first pre-determined number of bits is one bit.

7. The method as claimed in claim 1 wherein the second pre-determined number of bits is one bit.

8. The method as claimed in claim 1 wherein the obtained band segment is encoded with a Gray Code.

9. The method as claimed in claim 1 wherein the obtained index segment is encoded with a Gray Code.

10. The method as claimed in claim 1, wherein the second action includes recording a band segment error using a second penalty value.

11. The method as claimed in claim 10, wherein the second action further includes performing a band segment error recovery operation.

12. The method as claimed in claim 1 wherein the fourth action includes recording an index segment error using a fourth penalty value.

13. The method as claimed in claim 12 wherein the fourth action further includes performing an index segment error recovery operation.

14. The method as claimed in claim 1 further comprising: computing a first Hamming distance between the expected band segment and the obtained band segment.

15. The method as claimed in claim 1 further comprising: computing a second Hamming distance between the expected index segment and the obtained index segment.

16. The method as claimed in claim 1 wherein the band segments are grouped in a plurality of band segment groups of a predetermined number of tracks, wherein the band segments in each band segment group differ from the band segments in an adjacent band segment group by a predetermined increment.

17. The method as claimed in claim 16 wherein the index segments in each band segment group are arranged in at least one of an ascending and descending order, wherein each band segment group has a different arranged index segment order from an adjacent band segment group.

18. The method as claimed in claim 17 wherein the index segments in each band segment group are selected from a predetermined range of index segments.

19. The method as claimed in claim 1 further comprising a band index segment wherein the band index segment further identifies a sub-group of the group of tracks and the band segment further identifies a group of band index segments.

20. A system for processing track identification data in a disk drive comprising a plurality of concentric tracks, each track comprising a track identification field stored in a plurality of embedded servo sectors, each track identification field comprising a band segment identifying a group of tracks, and an index segment identifying a single track of the group of tracks, the system comprising:

an obtainment subsystem adapted to read a servo sector to obtain the track identification field;

a parser subsystem adapted to parse the track identification field to obtain the band segment;

a comparison subsystem adapted to compare the obtained band segment to an expected band segment to obtain a band segment differential; and an action initiator subsystem adapted to initiate a first action if the band segment differential exceeds a first pre-determined threshold and varies from the expected band segment by a first pre-determined number of bits; and to initiate a second action if the band segment differential exceeds the first predetermined threshold and does not vary from the expected band segment by the first pre-determined number of bits;

wherein the parser subsystem is further adapted to obtain the index segment from the parsed track identification field, wherein the comparison subsystem is further adapted to compare the obtained index segment to an expected index segment to obtain an index segment differential, and wherein the action initiator subsystem is further adapted to initiate a third action if the index segment differential exceeds a second pre-determined threshold and varies from the expected index segment by a second pre-determined number of bits: and to initiate a fourth action if the index segment differential exceeds the second predetermined threshold and does not vary from the expected index segment by the second pre-determined number of bits.

21. The system as defined in claim 20 wherein the first action includes correcting the obtained band segment.

22. The system as defined in claim 21 wherein the first action further includes recording a band segment error using a first penalty value.

23. The system as defined in claim 20 wherein the third action includes correcting the obtained index segment.

24. The system as defined in claim 23 wherein the third action farther includes recording an index segment error using a third penalty value.

25. The system as defined in claim 20 wherein the first pre-determined number of bits is one bit.

26. The system as defined in claim 20 wherein the second pre-determined number of bits is one bit.

27. The system as defined in claim 20 wherein the obtained band segment is encoded with a Gray Code.

28. The system as defined in claim 27, wherein the index segments in each band segment group are arranged in at least one of an ascending and descending order, wherein each band segment group has a different arranged index segment order from an adjacent band segment group.

29. The system as defined in claim 20 wherein the obtained index segment is encoded with a Gray Code.

30. The system as defined in claim 29, wherein the index segments in each band segment group are selected from a predetermined range of index segments.

31. The system as defined in claim 20, wherein the second action includes recording a band segment error using a second penalty value.

32. The system as defined in claim 31, wherein the second action further includes performing a band segment error recovery operation.

33. The system as defined in claim 20 wherein the fourth action includes recording an index segment error using a fourth penalty value.

34. The system as defined in claim 33 wherein the fourth action further includes performing an index segment error recovery operation.

35. The system as defined in claim 20 further comprising:
a computation subsystem adapted to compute a first Hamming distance between the expected band segment and the obtained band segment.

36. The system as defined in claim 20 further comprising:
a computation subsystem adapted to compute a second Hamming distance between the expected index segment and the obtained index segment.

37. The system as defined in claim 20 wherein the band segments are grouped in a plurality of band segment groups of a predetermined number of tracks, wherein the band segments in each band segment group differ from the band segments in an adjacent band segment group by a predetermined increment.

38. The system as defined in claim 20 further comprising a band index segment wherein the band index segment further identifies a sub-group of the group of tracks and the band segment further identifies a group of band index segments.

* * * * *

UNITED STATES PATENT AND TRADEMARK OFFICE
CERTIFICATE OF CORRECTION

PATENT NO. : 7,050,249 B1  Page 1 of 1
APPLICATION NO. : 10/239157
DATED : May 23, 2006
INVENTOR(S) : Jack M. Chue and Jai N. Subrahmanyam It is certified that error appears in the above-identified patent and that said Letters Patent is hereby corrected as shown below:

Col. 12, Line 45: after "action" delete "farther" and insert --further--.
(Claim 24, Line 2)

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,050,249 B1  
APPLICATION NO. : 10/329157  
DATED : May 23, 2006  
INVENTOR(S) : Jack M. Chue and Jai N. Subrahmanyam Page 1 of 1

It is certified that error appears in the above-identified patent and that said Letters Patent is hereby corrected as shown below:

Col. 12, Line 45: after "action" delete "farther" and insert --further--.
(Claim 24, Line 2)

This certificate supersedes Certificate of Correction issued December 5, 2006.

Signed and Sealed this

Second Day of January, 2007

JON W. DUDAS  
*Director of the United States Patent and Trademark Office*